(12) United States Patent
Biquez et al.

(10) Patent No.: US 6,492,609 B1
(45) Date of Patent: Dec. 10, 2002

(54) POWER STATION SWITCH WITH A RADIATOR/HEAT-EXCHANGER

(75) Inventors: François Biquez, Brignais (FR); Jean-Marc Willieme, La Mulatiere (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/706,861

(22) Filed: Nov. 7, 2000

(30) Foreign Application Priority Data

Nov. 8, 1999 (FR) .......................................... 99 139991

(51) Int. Cl.[7] ................................................. H01H 9/30
(52) U.S. Cl. .......................... 218/83; 218/134; 218/135; 218/140
(58) Field of Search ........................... 218/83, 2–7, 118, 218/120, 134, 135–6, 139, 140, 153–155

(56) References Cited

U.S. PATENT DOCUMENTS

| | | | |
|---|---|---|---|
| 3,626,125 A | * | 12/1971 | Tonegawa et al. .......... 218/118 |
| 3,848,103 A | | 11/1974 | Thuries |
| 4,086,459 A | * | 4/1978 | Rich ........................... 218/118 |
| 4,216,360 A | * | 8/1980 | Cherry et al. ................ 218/118 |
| 4,273,978 A | * | 6/1981 | Rostron ....................... 218/118 |
| 4,431,887 A | * | 2/1984 | Sturzenegger et al. ....... 218/118 |
| 5,350,892 A | * | 9/1994 | Rozier ......................... 218/154 |
| 6,198,062 B1 | * | 3/2001 | Mather et al. ............... 218/152 |

FOREIGN PATENT DOCUMENTS

| | | |
|---|---|---|
| DE | 27 07 206 A1 | 8/1978 |
| FR | 2 203 157 | 5/1974 |

* cited by examiner

*Primary Examiner*—Lincoln Donovan
*Assistant Examiner*—Tuyen T. Nguyen
(74) *Attorney, Agent, or Firm*—Sughrue Mion, PLLC

(57) ABSTRACT

A power station switch having high nominal current, the switch comprising a break chamber containing a dielectric gas under pressure and mounted inside a protective sheath which may optionally carry a general flow of cooling air, and a radiator/heat-exchanger situated outside said sheath and connected to said break chamber in which said gas under pressure is put into continuous circulation. Said gas under pressure as cooled in the radiator/heat-exchanger is returned to the break chamber via a metal case of the break chamber that is designed to be grounded.

5 Claims, 1 Drawing Sheet

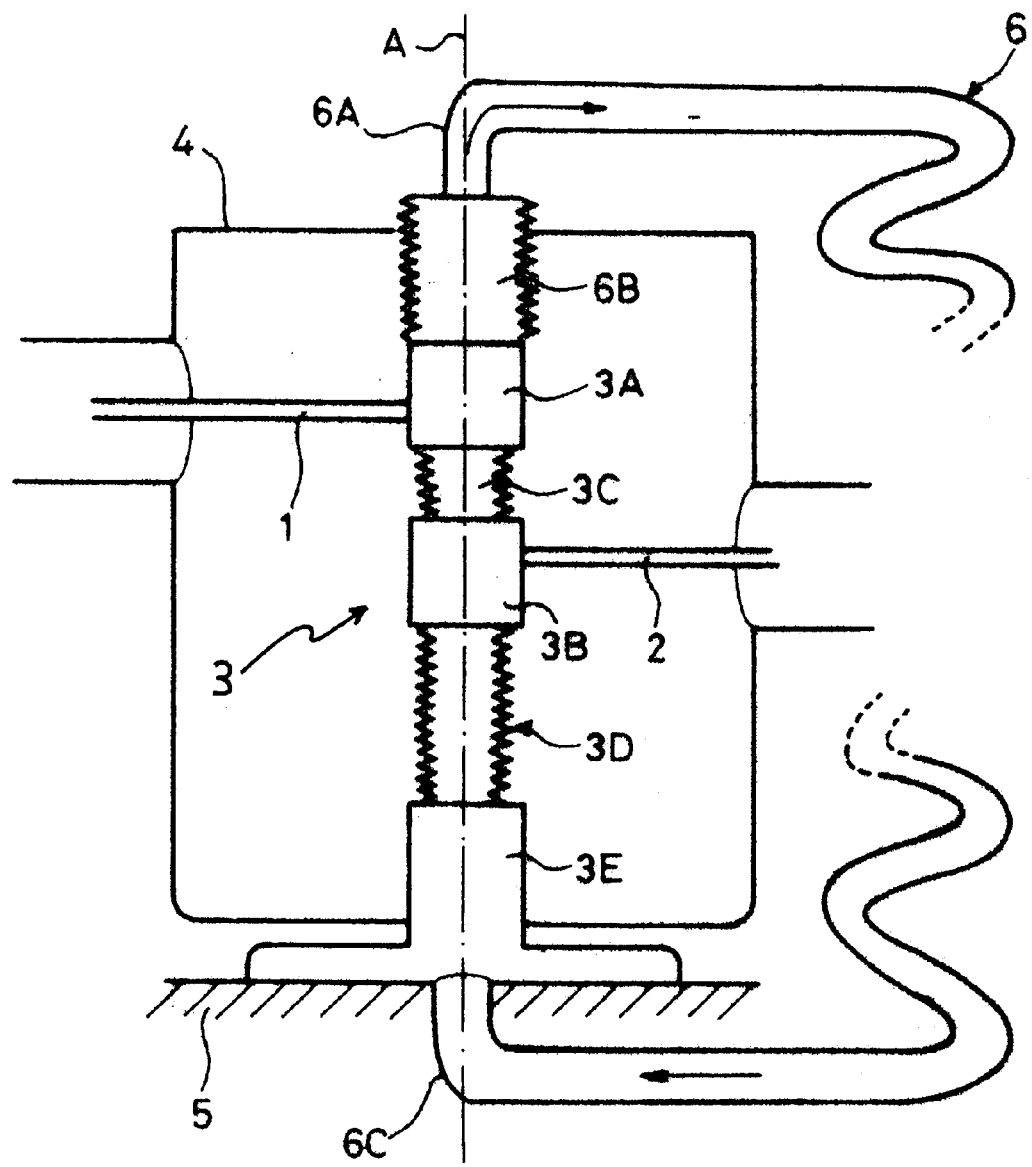

POWER STATION SWITCH WITH A RADIATOR/HEAT-EXCHANGER

The present invention relates to a power station switch having high nominal current, the switch comprising a break chamber containing a dielectric gas under pressure and mounted inside a protective sheath which may optionally carry a general flow of cooling air, and a radiator/heat-exchanger situated outside said sheath and connected to said break chamber in which said gas under pressure is put into continuous circulation.

BACKGROUND OF THE INVENTION

Such a switch is known in particular from French patent document No. 2 199 182. In that known switch, the radiator/heat-exchanger is connected to the break chamber via two hollow support insulators which extend radially from the break chamber. Other hollow insulators for grounding also support the break chamber in the sheath. The number of insulators used in that arrangement is an important factor in the cost of the switch.

OBJECT AND SUMMARY OF THE INVENTION

The object of the invention is to propose a solution for reducing the cost of such a switch fitted with a radiator/heat-exchanger.

To this end, the invention provides a power station switch having high nominal current, the switch comprising a break chamber containing a dielectric gas under pressure and mounted inside a protective sheath, and a radiator/heat-exchanger situated outside said sheath and connected to said break chamber and in which said gas under pressure is put into continuous circulation, wherein said gas under pressure as cooled in the radiator/heat-exchanger is returned to the break chamber via a metal case of the break chamber that is designed to be grounded. With this arrangement, the connection of the radiator/heat-exchanger to the break chamber requires the use of a single hollow insulator instead of two as in the prior art, thereby reducing the cost of making the switch. The case that is for grounding is typically the case which has installed therein the mechanism for driving the contacts of the break chamber.

In a particular embodiment of a switch of the invention, the break chamber extends axially along a vertical direction and has at its bottom end a bottom metal case for grounding and at its top end a top metal case connected to said radiator/heat-exchanger via a hollow insulator forming an insulating bushing. This in-line disposition of the connections between the outlet tube from the radiator/heat-exchanger, the bottom metal case of the break chamber, the top metal case of the break chamber, the hollow insulator forming an insulating bushing, and finally the inlet tube of the radiator/heat-exchanger, favors natural convection to drive circulation of the gas under pressure from the break chamber to the radiator/heat-exchanger and from the radiator/heat-exchanger to the break chamber along a vertical axis, and thus favors heat exchange. In addition, this disposition contributes to increasing the draw height for natural convection, thereby enhancing the speed at which the gas under pressure circulates in the radiator/heat-exchanger and in the break chamber.

BRIEF DESCRIPTION OF THE DRAWING

The sole FIGURE is highly diagrammatic and shows a switch of the invention in section on a vertical plane.

MORE DETAILED DESCRIPTION

Inlet and outlet conductors 1 and 2 of the switch are disposed horizontally in this embodiment while the break chamber 3 is disposed vertically. The break chamber 3 with the conductors 1 and 2 are disposed in a protective metal sheath 4 having a general flow of cooling air for the conductor 1 and 2 passing therethrough.

The break chamber has a top metal case 3A at its top end in which there is disposed, in particular, a fixed contact which is electrically connected to the inlet conductor 1, and an intermediate metal case 3B in which there is disposed, in particular, a moving contact electrically connected to the outlet conductor 2. The case 3B is connected to the case 3A by a hollow insulator 3C. The break chamber further includes, at its bottom end, a bottom metal case 3E containing the device for driving the moving contact. The case 3E is connected to the case 3B by a hollow insulator 3D. The cases 3A, 3B, and 3E, and the hollow insulators 3C and 3D are in alignment along the axis A. The case 3E serves as a support for the protective sheath 4 and is grounded when mounted on the metal frame 5 supporting the switch.

As can be seen in the figure, the switch has a radiator/heat-exchanger 6 situated outside the sheath and comprising an inlet tube 6A connected on the axis to the top case 3A of the break chamber via a hollow insulator 6B forming an insulating bushing through the sheath 4. The hollow insulator 6B lies on the same axis as the inlet tube 6A and the case 3A. The radiator/heat-exchanger 6 also has an outlet tube 6C which is connected directly to the underside of the bottom case 3E of the break chamber, on the axis thereof. The dielectric gas, e.g. $SF_6$, under a pressure of a few bars inside the break chamber circulates by natural convection through the radiator/heat-exchanger 6 as represented by arrows, the cooled gas leaving the heat-exchanger being returned directly to the break chamber via a hollow through the case 3E. The gas under pressure circulates along the vertical axis A and through the break chamber 3 between the outlet tube 6C and the inlet tube 6A of the radiator/heat-exchanger.

The outlet tube 6C of the radiator/heat-exchanger can be connected directly to the grounded metal case 6E of the break chamber equally well in a switch configuration in which the break chamber is inclined relative to the horizontal.

What is claimed is:

1. A power station switch having high nominal current, the switch comprising:

a break chamber mounted inside a protective and electrically conductive sheath, said break chamber containing a dielectric gas under pressure put into continuous circulation, and a radiator/heat-exchanger situated outside said sheath and connected to said break chamber to cause said dielectric gas to circulate and to cool said dielectric gas, wherein the break chamber has a bottom metal case at its lower end enabling the dielectric gas cooled in the radiator/heat-exchanger to pass towards the low end of said break chamber, said bottom metal case being grounded and being in electrical contact with said protective and electrically conductive sheath, and wherein said break chamber has at its top end a top metal case connected to said radiator/heat-exchanger via a hollow insulator.

2. The switch of claim 1, wherein the break chamber extends axially along a vertical direction, and wherein the bottom metal case and the top metal case are disposed on the same axis as said break chamber.

3. The switch of claim 2, wherein the dielectric gas enters said break chamber along the same axis as said break chamber via an outlet tube connected to said bottom metal case, and the dielectric gas exits said break chamber along the same axis as said break chamber via an inlet tube connected to said top metal case.

4. The switch of claim 1, further comprising:
- a fixed contact disposed in a top metal case which is electrically connected to an inlet conductor;
- a moving contact disposed in an intermediate metal case which is electrically connected to an outlet conductor; and
- a hollow insulator connecting said top metal case to said intermediate metal case,
- wherein said bottom metal case contains a device for driving said moving contact, and
- wherein said hollow insulator, said top metal case, said intermediate metal case and said bottom metal case each have a longitudinal axis in vertical alignment with a longitudinal axis of said break chamber.

5. The switch of claim 1, wherein said bottom metal case serves as a support for said protective sheath, and is mounted on a metal frame supporting the switch.

* * * * *